United States Patent [19]
Wilcox

[11] 3,854,557
[45] Dec. 17, 1974

[54] UNIVERSAL JOINT FOR PISTON-CONNECTING ROD ASSEMBLY

[75] Inventor: Lance C. Wilcox, Wilton, Conn.

[73] Assignee: Airpot Corporation, Norwalk, Conn.

[22] Filed: Mar. 13, 1972

[21] Appl. No.: 233,898

Related U.S. Application Data

[63] Continuation of Ser. No. 8,449, Feb. 4, 1970, abandoned.

[52] U.S. Cl. .................. 188/322, 137/539, 188/282, 403/133, 403/138
[51] Int. Cl. .................. F16f 9/34
[58] Field of Search .................. 188/282, 322, 268; 137/539, 516.29; 287/20 P, 90 R, 90 C; 403/133, 138

[56] References Cited

UNITED STATES PATENTS

| | | | |
|---|---|---|---|
| 1,923,414 | 8/1933 | Benjamin | 287/90 R |
| 1,923,601 | 8/1933 | Weaver | 403/133 |
| 1,931,102 | 10/1933 | Casper | 287/90 R |
| 2,324,984 | 7/1943 | Brown | 287/90 R |
| 2,393,501 | 1/1946 | Brown | 287/90 R |
| 3,175,646 | 3/1965 | Wilcox | 188/297 |

FOREIGN PATENTS OR APPLICATIONS

| | | | |
|---|---|---|---|
| 1,106,947 | 3/1968 | Great Britain | 287/90 R |

*Primary Examiner*—George E. A. Halvosa

[57] ABSTRACT

A joint for universally pivotally mounting a connecting rod to a piston in force transmitting relationship, for use in a dashpot cylinder or the like, comprises a ball-like member rigidly mounted on the connecting rod and pivotally received within an elastomeric socket member within a body operatively connected to said piston. In one embodiment the ball-like member is spring biased into sealing engagement with said socket member to provide one-way valve action.

10 Claims, 5 Drawing Figures

PATENTED DEC 17 1974
3,854,557
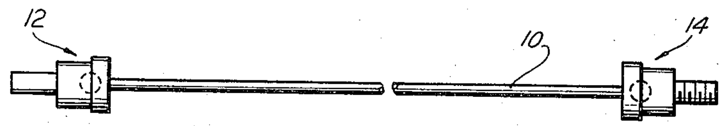
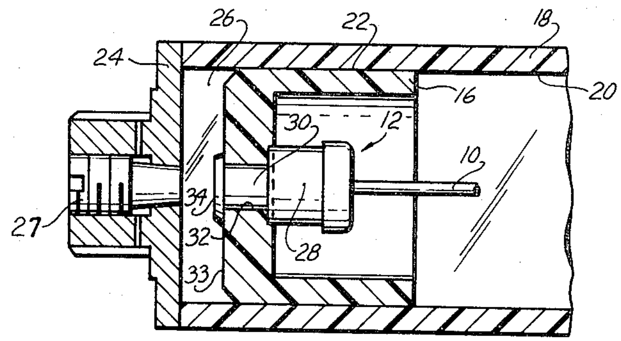
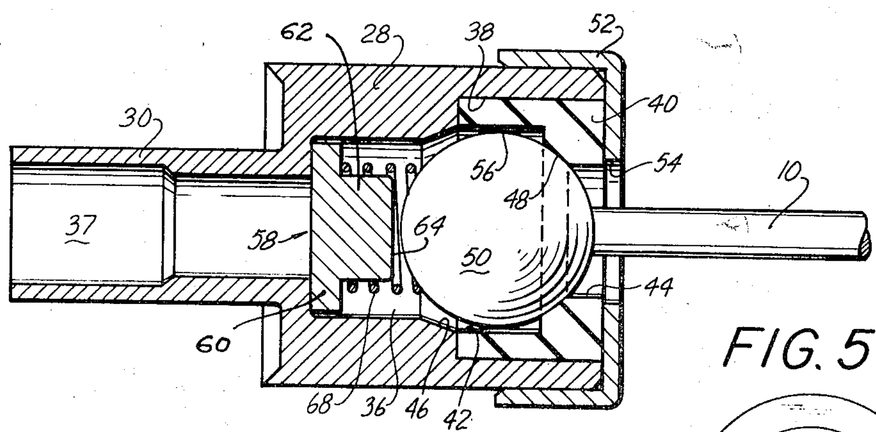
FIG. 5
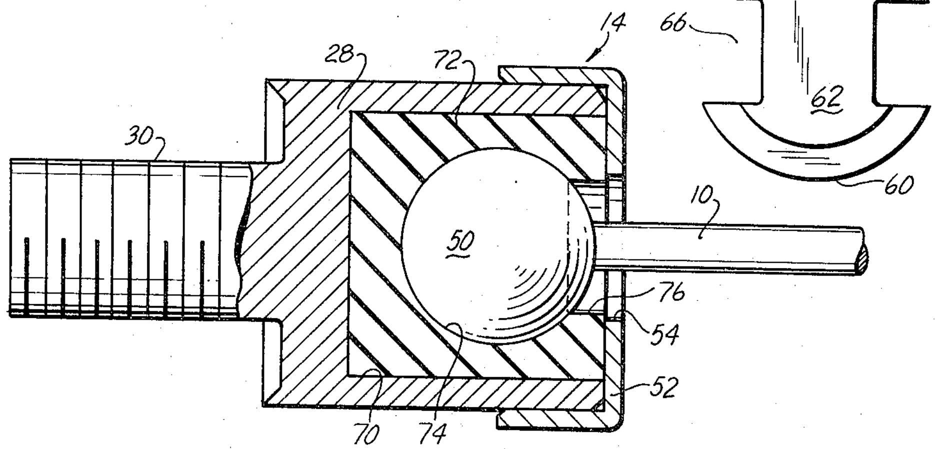
INVENTOR
LANCE C. WILCOX
BY James and Franklin
ATTORNEY

UNIVERSAL JOINT FOR PISTON-CONNECTING ROD ASSEMBLY

This is a continuation of application Ser. No. 8449 filed Feb. 4, 1970, now abandoned.

The present invention relates to structure for connecting a piston and a piston rod adapted to permit a degree of universal movement therebetween. One embodiment is also adapted to provide valve action controlling the passage of fluid through the piston.

In many piston-cylinder assemblies it is desirable that the piston rod which extends from the piston, and which is designed to transmit motion either to or from the piston, have a degree of pivotal movement relative to the piston. In conventional assemblies this is accomplished by means of an ordinary hinge or connection between the piston rod and the piston. While such connecting arrangements are more or less satisfactory in large assemblies, they are not sufficiently reliable on a smaller scale, as where the piston-cylinder assembly functions as a damping dashpot for a sensitive electromagnetic assembly (see for example Cohen Pat. No. 2,580,732 of Jan. 1, 1952, entitled "Finger-Type Circuit Regulator.") In addition, such constructions add appreciably to the cost of manufacture both with respect to the cost of parts and the time involved in assembly of the parts.

Hinge connections of the type above referred to require precise orientation of the piston relative to external equipment to which it is connected, thus making the installation difficult. Also, by reason of the fact that rotation of the piston within the cylinder is positively prevented by the hinge, such connections inhibit accurate alignment of the piston relative to the cylinder. Thus, operation, under conditions of vibration, shock and abuse of the equipment is rather unreliable.

In cylinder piston assemblies designed for damping purposes it may be desirable to provide different degrees of damping upon movement of the piston in different directions. This is generally accomplished by means of a fluid passage through the piston accompanied by a fluid-pressure-activated one-way valve in said passage to differentially control the flow of fluid therethrough. The provision of such a valve represents a significant source of expense. In addition, the lack of positive operation of such valves is a continuing source of trouble in operation.

My Pat. No. 3,175,646 of Nov. 30, 1965, entitled "Joint For Piston-Piston Rod Combination and Valve Function Thereof," discloses a universal joint connecting a piston to a piston-rod and providing a degree of universal movement therebetween. In accordance with that invention the piston is provided with an element defining a chamber, and the rod is provided at its end with an enlarged, ball-like part received and retained in said chamber and relatively freely rotatable therein. The piston rod proper extends out from the chamber through an aperture therein providing an appreciable clearance for such movement. Also disclosed in said above-mentioned patent is an embodiment adapted to provide directional valve action through the piston. In accordance with this embodiment the ball-like member is spring biased against one end of said chamber in sealing engagement and is adapted to move within said chamber towards the opposite end of the chamber to open said seal and provide a fluid passage through said piston.

The primary disadvantage of the arrangement disclosed in my above-mentioned patent is that the ball-like member is adapted to operatively sealingly engage a wall of said chamber along one edge thereof. Thus, it has been found that the element defining the chamber, and to some extent the ball-like member itself, exhibits significant wear after short periods of use, oftentimes requiring replacement of the entire assembly within a relatively short period of time. Indeed, sometimes the ball-like member rapidly wears so much that it slides out from the chamber. The wear characteristics of this assembly are even more critical in the embodiment adapted to provide directional valve action. In such a case, significant wear may induce the effectiveness of or even completely destroy the sealing engagement of the ball-like mmeber against the chamber wall in a relatively short period of time, thus rendering the assembly inoperative for its intended purpose.

It has been found that the wear characteristics of the above arrangement are the result of two factors: the shape of the chamber vis-a-vis the shape of the ball-like member and the metal-to-metal contact of the ball-like member and the chamber wall.

It is a primary object of the present invention to devise, in piston-cylinder assembly, a novel structure for the universal connection between a piston rod and a piston, which structure exhibits an unusual resistance to galling or wearing even after prolonged use.

It is another object of the present invention to permit the piston rod a limited degree of universal movement relative to the piston without placing any strain on the piston itself, thus preventing undue wear on the contacting piston-cylinder surface.

It is a further object of the present invention to provide a structurally simple connection between a piston rod and a piston which will provide for the transmission of linear movement from one to the other and will at the same time function as a directional valve, permitting relatively free fluid flow through the piston upon movement of the piston-piston rod combination in one direction and completely cutting off fluid flow through the piston upon movement of the piston-piston rod combination in the other direction.

It is a further object of the present invention to achieve the above results by means of a very simple structure which is easy to assemble and inexpensive to manufacture.

In accordance with the present invention the piston is provided with an element defining a chamber on one side thereof. The connecting rod is provided with a ball-like member rigidly mounted on one end thereof. A socket member of resilient elastomeric material is adapted to be snugly received within said chamber and is provided with a ball-like hollow defining an inner surface at least in part substantially conforming to the shape of said ball-like member. The socket member is provided with an aperture smaller then the diameter of said ball-like member but larger than the diameter of said piston rod. The ball-like member is adapted to be inserted into the aperture and received within the ball-like hollow defining the inner surface of said socket member. The rod thus extends out from the socket member through said aperture preferably with an appreciable clearance therearound. The thus constructed piston rod socket assembly is then inserted within the chamber and a closure member provided with an aperture of substantially the same size as said socket aperture and adapted to register therewith is operatively connected to the open end of the element defining said chamber. With this construction the piston rod is firmly secured to the piston in force transmitting relation and is afforded at least a limited degree of universal movement relative to the piston without causing the piston to bend or cant within the cylinder.

A second embodiment adapted to provide directional valve action utilizes a modified form of the above structure. The piston is provided with a fluid passage extending between said chamber and the end of the piston facing the cylinder cavity. The ball-like member has a limited degree of free axial movement within the chamber and is urged by resilient means toward one of said chamber. An open ended socket member of resilient elastomeric material is adapted to be received within said one end of said chamber and is provided with an inner surface conforming substantially to that portion of the surface of the ball-like member which it is adapted to engage. When force is transmitted through the connected rod to the piston in one direction, the ball-like member is urged against the inner surface of the elastomeric socket member in sealing engagement, thus cutting off fluid flow through the piston. When the piston rod exerts force on the piston in the opposite direction the ball-like member is urged against the force of said resilient means toward the other end of said chamber away from said socket means to provide a clearance between said socket means and said ball-like member, defining a fluid path through said piston.

The element defining the chamber in which the end of the piston rod is received is preferably, although not necessarily, made separate from the piston, so that said element and the piston rod may be assembled conveniently and inexpensively, that element thereafter being secured to the piston in any appropriate manner.

To the accomplishment of the above, and to such other objects as may hereafter appear, the present invention relates to a structure for connecting a piston rod to a piston as defined in the appended claims and as described in this specification, taken together with the accompanying drawings, in which:

FIG. 1 is a side elevational view of an assembly of a piston rod and an element adapted to be attached to a piston, made in accordance with the present invention;

FIG. 2 is a cross-sectional view on an enlarged scale of a generalized piston-cylinder combination in which the assembly of FIG. 1 is secured to the piston;

FIG. 3 is a cross-sectional view, on a still further enlarged scale, of an embodiment of the generalized piston rod-element assembly of FIG. 1, which embodiment is designed to prevent fluid flow through the piston when the piston rod pulls the piston and to facilitate fluid flow therethrough when the piston rod pushes the piston;

FIG. 4 is a view similar to FIG. 3, but showing an alternative embodiment in which no valving action is provided; and FIG. 5 is a front view of the ball stop member of the embodiment of FIG. 3, showing the slotted flow passages therein.

FIG. 1 illustrates generally the environment in which the present invention may be used. As there shown, connecting rod 10 has an assembly generally designated 12 at one end thereof adapted to be secured to a piston and has another assembly 14 at its other end to facilitate attachment to an external linkage or mechanism.

Assembly 12 may be constructed in accordance with either embodiment of the present invention. Assembly 14 is adapted to be constructed in accordance with the embodiment of FIG. 4. Both assemblies are adapted to provide a limited degree of universal movement of connecting rod 10 with respect to the piston and the external linkage or mechanism which drives the rod.

FIG. 2 illustrates a piston-cylinder arrangement showing one mode of attachment of assembly 12 to the piston. Piston 16 is mounted in cylinder 18 for slidable movement therein, a fluid seal being achieved between the inner surface 20 of cylinder 18 and the outer surface 22 of piston 16. The cylinder 18 is provided with an end wall 24, a cavity 26 being defined between end wall 24 and piston 16. A valve 27 is mounted in any appropriate manner in the cylinder end wall 24 so as to control the flow of fluid into and through the cylinder cavity 26.

Piston rod 10 is connected to piston 16 by means of assembly 12. The assembly 12 generally comprises an element having a body 28 and an axially extending portion 30. Axially extending portion 30 is adapted to be received and extend through an aperture 32 in piston 16. As shown in FIG. 2, the axially extending portion 30 is adapted to be spun over at 34 in order to firmly secure assembly 12 to piston 16. It can be seen that by virtue of this spun over portion 34 and the engagement between body 28 and the other side of piston 16, aperture 32 is substantially sealed against the flow of fluid therethrough. This mode of attachment is, of course, for illustrative purposes only and any suitable attachment means may be utilized. For example, as illustrated in FIG. 4, the extending portion 30 may be externally threaded, in which case the aperture 32 through the piston front wall 33 will be correspondingly internally threaded, the assembly 12 being secured to piston 16 by threaded engagement, with or without the addition of a sealing compound as required in order to prevent leakage of fluid between the piston 16 and the assembly 12. The threaded extending portion 30 could, of course, also be employed with the embodiment shown in FIG. 3.

The embodiment shown in FIG. 3 is designed to provide both a universal connection between piston 16 and rod 10, and a valving action responsive to the direction in which piston 16 is urged by rod 10. Thus, the arrangement shown will provide substantially more fluid pressure resistance to movement of piston 16 to the right than to the left as viewed in FIG. 2. To this end, body 28 is formed with a chamber 36 opening away from portion 30 and axially extending portion 30 is provided with a passage 37 communicating with chamber 36 and opening into cylinder cavity 26. Chamber 36 is formed at its open end with a cylindrical bore 38. A cylindrical socket member 40, formed of an elastomeric material such as rubber, is snugly received within bore 38. The outer diameter of socket member 40 is substantially equal to that of bore 38, thus providing a fluid-tight fit. As illustated, socket member 40 is formed with two bores 42 and 44. Bore 42 extends in from the left edge of socket member 40 and serves as a continuation of chamber 36, mating smoothly with the large end of tapered body surface 46. Bore 44, of a smaller diameter than bore 42, extends in from the right edge of socket member 40 and provides an opening for connecting rod 10. A concave shaped valve seat 48 is provided on the inner surface of socket member 40 between bores 42 and 44.

The end of piston rod 10 is provided with an enlarged, and preferably ball-like member 50 rigidly mounted thereon and received within chamber 36, connecting rod 10 extending out therefrom through bore 44 in socket member 40. A closure member 52 is firmly secured to the open end of body 28 by any suitable means, and serves to retain socket member 40 within bore 38. Closure member 52 is provided with an aperture 54 adapted to register with bore 44 of socket member 40 so as to provide a sizable clearance through which connecting rod 10 extends. The diameter of member 50 is smaller than that of bore 42, thus providing a clearance therebetween at 56. Ball-like member 50, when pulled to the right by connecting rod 10, is adapted to engage valve seat 48 at the righthand end of chamber 36 in sealing but rotatable relationship. A ball stop member generally designated 58 is provided at the left hand end of chamber 36 and is adapted to engage ball-like member 50 when it is pushed to the left by connecting rod 10. Ball stop member 58 is provided with a flanged portion 60 adapted to engage the left hand wall of chamber 36 surrounding the opening to passage 37 and a body member 62 adapted to engage ball-like member 50 at surface 64 (FIG. 3). As more clearly shown in FIG. 5, ball stop 58 is provided with two axially extending slot-like passages 66 adapted to maintain fluid communication between passage 37 and chamber 36 regardless of the position of ball-like member 50 within chamber 36. A coil spring 68 surrounds body portion 62 of ball stop 58 and engages flanged portion 60 at one end and ball-like member 50 at its other end.

It will be apparent that assembly 12 provides both a partial universal connection between piston 16 and rod 10 and a force transmissive structure designed to produce a motion sensitive valving action. In its normal position (e.g., in the absence of force transmission through rod 10), ball-like member 50 is urged to the right against valve seat 48 in sealing engagement, thus closing off fluid flow through chamber 36. When rod 10 is pulled to the right, the seal thus produced is strengthened and becomes more effective. At the same time valve seat 48 is adapted to serve as a bearing surface for universal rotation of ball-like member 50 within socket 40 in response to any lateral movement or adjustment by the external mechanism (not shown) to which connecting rod 10 is secured at its other end via assembly 14 (FIG. 1). Ball-like member 50 is, of course, freely rotatable relative to coil spring 68, with which it has minimal surface contact.

It has been found that a resilient elastomeric material is best suited for the dual function served by socket member 40. Silicone rubber has been found particularly effective for this purpose, primarily because it displays outstanding wear characteristics and temperature range. Thus, silicone rubber socket members of the type described have been tested in the environment here disclosed and the results indicate that they are practically immune to wear over the life of the assembly in which they are utilized as compared to a life span of approximately 2 years for the retainer means used in the assembly disclosed in my aforementioned Pat. No. 3,175,646. In addition, unlike metal to metal bearing surfaces, a bearing surface of an elastomeric material such as silicone rubber requires no significant clearance from its mating metal surface (e.g., ball-like member 50) to account for frictional engagement of the relatively rough metal surfaces. Thus, my elastomeric socket member is considerably more effective as a sealing means than previous devices.

It will be apparent that when piston 16 is pulled to the right, fluid will not pass therethrough and a very high degree of damping will result. When, however, the piston is pushed to the left by rod 10, ball-like member 50 is urged to the left against the bias of spring 68 toward stop member 58, thus opening a fluid passage at valve seat 48. Fluid may then flow through piston 16 via passage 37, passage 66, chamber 36, clearance 56, past valve seat 48, through bore 44 and aperture 54. As a result, the piston will be able to move more readily to the left against a considerably lesser degree of fluid damping. In this position, ball-like member 50 engages stop member 66 in force transmitting point contact and is adapted to rotate relative thereto. Ball stop 58 will, of course, wear as a result of such rotation, eventually forming a concave recess in surface 64 conforming to the convex surface of member 50. Such recessed bearing surface together with the engagement of spring 68 with member 50 will serve to laterally stabilize ball-like member 40 within chamber 36 in its valve open position.

FIG. 4 illustrates a second embodiment adapted to provide a universal connection between connecting rod 10 and the assembly generally designated 14 without, however, permitting any fluid flow through the assembly in either direction. This embodiment is primarily designed for use as a connection between the rod 10 and the external linkages (not shown) which are to be controlled or moved (see FIG. 1). However, such an assembly may be used with the piston 16 in the same manner as described with reference to the embodiment of FIG. 3, when no differential damping is desired.

As illustrated in FIG. 4, body 28 is provided with a generally cylindrical open ended chamber 70. A socket member 72 having an external shape at least in part substantially conforming to chamber 70 is adapted to be snugly received within chamber 70 and is provided with a ball-like hollow 74 of substantially the same shape and size as ball-like member 50. Communicating with ball-like hollow 74 at the open end of chamber 70 is an aperture 76, adapted to register with aperture 54 in closure member 52. Socket member 72, like socket member 40 of FIG. 3, is made of a resilient elastomeric material such as silicone rubber. A particular advantage of using this material in this embodiment, in addition to its wear characteristics noted above, is that it permits the use of a one-piece socket member of the shape illustrated. Ball-like member 50 is merely forcibly inserted through the resilient aperture 76 into socket member 72 and is snugly and rotatably received within ball-like hollow 74. Socket member 72 containing the thus inserted ball-like member 50 is then in turn inserted into chamber 70 in body 28, and closure member 52 is secured to body 28, so as to retain socket member 72 in the position illustrated. It will be apparent that in this position, ball-like member 50 cannot be removed from ball-like hollow 74. Ball-like member 50 is, of course, adapted to rotate within hollow 74, apertures 76 and 54 providing a considerable degree of lateral clearance for the corresponding movement of rod 10. Thus, there is provided a simple ball joint comprising a one-piece socket member adapted to transmit axial motion in both directions and at the same time provide a rotational bearing surface for a ball-like member 50.

To reduce frictional resistance to the rotation of ball-like member 50, the socket members of both FIGS. 3 and 4 may be impregnated with a lubricant such as powdered graphite. This may be easily accomplished by immersing the socket members in a receptacle containing graphite powder and applying slight agitation thereto until the surface of each member is visibly blackened by the powder.

It will be apparent from the above, that none of the parts of the assemblies described need be manufactured to any particularly close tolerances. The elastomeric socket members of both embodiments provide a simple, inexpensive and exceedingly wear resistant bearing surface for universal rotational movement of ball-like member 50. The use of an elastomeric material makes possible an easy to manufacture one-piece socket member which may be rapidly and conveniently incorporated into the assembly of FIG. 4.

The cooperation of the parts in the embodiments of FIG. 3 is such that when valving action is produced the greater the force exerted by the rod 10 when sealing or valve-closing action is desired, the more effective will be that sealing action. Misalignment of the rod 10, or any tilting thereof in accordance with the lateral movement of the external linkage or mechanism to which it is connected, will not cause any appreciable tilting or misalignment of the piston 16 within the cylinder 18 nor will any strain be exerted on the external mechanism to which the rod 10 is connected.

Hence by means of simple and inexpensive structure an improved highly wear resistant mechanical connection between piston rod and piston is achieved, better and more reliable operation of the piston-cylinder assembly results, and, where desired, a highly effective one-way valving action is effectively incorporated into the piston-cylinder assembly.

While but two embodiments of the present invention are here specifically disclosed, it will be apparent that many variations may be made therein, all within the scope of the instant invention as defined in the following claims.

I claim:

1. In a miniature damping dashpot for use in electromagnetic assemblies or the like, a piston-connecting rod assembly for universally pivotally mounting a connecting rod in force transmitting relationship to a piston comprising a ball-like member rigidly mounted on said connecting rod, an element operatively connected to said piston and having an open-ended chamber therein, said connecting rod extending into said chamber with said ball-like member received therein, and retainer means having an aperture through which said connecting rod extends with lateral clearance therearound; the improvement comprising a socket member formed substantially completely of soft easily deformable rubber-like elastomeric material received, with substantially no deformation thereof, within said chamber and having a concave ball-like inner surface adapted to operatively engage the outer surface of said ball-like member along an area shaped to conform to a substantial portion of the surface of said ball-like member with substantially no deformation of said concave surface, said socket member surface having an aperture in registration with said aperture on said retainer means through which said connecting rod extends with lateral clearance therearound, the lateral clearance between said connecting rod and both said apertures being sufficient to permit said connecting rod a degree of universal movement relative to said element as it moves angularly relative to said cylinder, said socket member aperture being of a size normally insufficient to allow passage of said ball-like member therethrough, said elastomeric material surrounding said aperture in said socket member being yieldable to allow insertion of said ball-like member through said socket member aperture, thereby to provide for the mounting of said socket member on said connecting rod prior to insertion of said socket member into said chamber, whereby said socket member is effective to provide a bearing surface for universal rotation of said ball-like member within said socket member to act as a resilient linear force transmitting member between said connecting rod and said piston, and to act as a soft shock-absorbing and wear-resistant element, said retainer means engaging said socket member and retaining it substantially immovably in said chamber.

2. The piston-connecting rod assembly of claim 1, wherein said elastomeric material is a silicone rubber composition impregnated, at least on its concave inner surface, with graphite.

3. The piston-connecting rod assembly of claim 1, wherein said socket member inner surface comprises a ball-like hollow conforming substantially in size and shape to said ball-like member, said aperture in said socket member surface being of smaller diameter than said ball-like hollow and communicating therewith, whereby said ball-like member is adapted to be forced through said aperture in said socket means and to enter said ball-like hollow prior to insertion of said socket means into said chamber.

4. The piston-connecting rod assembly of claim 3, wherein said socket member is snugly received in said chamber.

5. The piston-connecting rod assembly of claim 3, wherein said elastomeric material is a silicone rubber composition impregnated, at least on its concave inner surface, with graphite.

6. The piston-connecting rod assembly of claim 1, wherein the socket member is snugly received in said chamber, and said inner surface is adapted to physically contact the outer surface of said ball-like member.

7. The piston-connecting rod assembly of claim 4, wherein said element is provided with a conduit extending from one side of said piston through said chamber and said aperture to the other side of said piston and the outer surface of said socket member sealingly engages the inner surface of said chamber, further comprixing means for normally urging said ball-like member against said socket member in sealing relationship to normally seal off said conduit, said urging means being yieldable upon application of force against said ball-like member away from said socket means, thereby to permit a flow of fluid through said element from one side of said piston to the other.

8. The piston-connecting rod assembly of claim 7, wherein said elastomeric material is a silicone rubber composition impregnated, at least on its concave inner surface, with graphite.

9. The piston-connecting rod assembly of claim 7, wherein said socket member comprises a cylinder having a first axial bore extending inwardly from one side of said cylinder to a first plane and a second axial bore, smaller than said first axial bore, extending inwardly from the other side of said cylinder but terminating at a second plane short of said first plane, said ball-like inner surface extending from said first to said second plane and having a radius of curvature substantially the same as that of said ball-like member, and wherein said ball-like member is normally urged against said ball-like surface in sealing but rotatable engagement.

10. The piston-connecting rod assembly of claim 9, wherein said elastomeric material is a silicone rubber composition impregnated, at least on its concave inner surface, with graphite.

* * * * *